US010651741B2

(12) United States Patent
Wu et al.

(10) Patent No.: US 10,651,741 B2
(45) Date of Patent: May 12, 2020

(54) SERIAL INPUT POWER CONVERTER

(71) Applicant: TEXAS INSTRUMENTS INCORPORATED, Dallas, TX (US)

(72) Inventors: Wenkai Wu, East Greenwich, RI (US); Shishuo Zhao, East Greenwich, RI (US); Weidong Zhu, East Lyme, CT (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 45 days.

(21) Appl. No.: 16/051,003

(22) Filed: Jul. 31, 2018

(65) Prior Publication Data

US 2019/0109539 A1    Apr. 11, 2019

Related U.S. Application Data (60) Provisional application No. 62/570,702, filed on Oct. 11, 2017.

(51) Int. Cl.
*H02M 3/158* (2006.01)
*G06F 1/26* (2006.01)
(Continued)

(52) U.S. Cl.
CPC ............ *H02M 3/1584* (2013.01); *G06F 1/26* (2013.01); *H02M 3/157* (2013.01); *H02M 3/285* (2013.01); *H02M 2001/0009* (2013.01)

(58) Field of Classification Search
CPC .... H02M 3/1584; H02M 3/285; H02M 3/157; H02M 2001/0009; G06F 1/26
(Continued)

(56) References Cited

U.S. PATENT DOCUMENTS

| 7,893,669 B2 * | 2/2011 | Osterhout | ........... H02M 3/1584 |
| | | | 323/272 |
| 2007/0200538 A1* | 8/2007 | Tang | ..................... H02M 3/157 |
| | | | 323/237 |

(Continued)

OTHER PUBLICATIONS

Received STIC search report from EIC 2800 searcher Samir Patel on Oct. 24, 2018. (Year: 2018).*

*Primary Examiner* — Nguyen Tran
*Assistant Examiner* — Htet Z Kyaw
(74) *Attorney, Agent, or Firm* — Michael A. Davis, Jr.; Charles A. Brill; Frank D. Cimino (57) ABSTRACT

An apparatus includes first and second power converter stages, each stage having a primary side and a secondary side. The primary side of the first stage includes a switch $T1_A$ coupled to a voltage source and a switch $T3_A$ coupled to the switch $T1_A$. The primary side of the second stage includes a switch $T2_A$ coupled to the switch $T3_A$ and a switch $T4_A$ coupled to the switch $T3_A$ and to the voltage source. The apparatus includes a control circuit to control an on/off time of the switches. The control circuit includes four gate driver controllers to control the on/off time of the switches and a current sharing control section to increase or decrease the on time of a switch based on a comparison of a current through one of multiple output inductors to an average current through the multiple output inductors.

16 Claims, 8 Drawing Sheets

(51) Int. Cl.
*H02M 3/157* (2006.01)
*H02M 3/28* (2006.01)
*H02M 1/00* (2006.01)

(58) Field of Classification Search
USPC .................. 323/271, 272; 363/21.02–21.18
See application file for complete search history.

(56) References Cited

U.S. PATENT DOCUMENTS

2017/0025961 A1* 1/2017 Seeman .................. H02M 1/08
2017/0353116 A1* 12/2017 Zhang ..................... H02M 1/08

\* cited by examiner

SERIAL INPUT POWER CONVERTER

CROSS-REFERENCE TO RELATED APPLICATIONS

The present application claims priority to U.S. Provisional Patent Application No. 62/570,702, which was filed Oct. 11, 2017, is titled "Serial Input Multiphase Converter," and is hereby incorporated herein by reference in its entirety.

SUMMARY

In accordance with at least one example of the disclosure, a system comprises first and second power converter stages, each power converter stage comprising a primary side and a secondary side. The primary side of the first power converter stage further comprises a switching element $T1_A$ coupled to a voltage source and a switching element $T3_A$ coupled to the switching element $T1_A$. The primary side of the second power converter stage further comprises a switching element $T2_A$ coupled to the switching element $T3_A$ and a switching element $T4_A$ coupled to the switching element $T3_A$ and to the voltage source. The system also comprises a control circuit configured to control an on/off time of the switching elements. The control circuit comprises four gate driver controllers, each configured to control the on/off time of one of switching elements $T1_A$, $T2_A$, $T3_A$, and $T4_A$; and a current sharing control section coupled to the gate driver controllers. The current sharing control section is configured to compare a current through each of multiple output inductors on the secondary sides of the first and second power converter stages to an average current through the multiple output inductors; and as a result of the current through one of the multiple output inductors greater than the average current, decrease the on time of a corresponding switching element and, as a result of the current through the one of the multiple output inductors being less than the average current, increase the on time of the corresponding switching element.

In accordance with another example of the disclosure, a system comprises first and second power converter stages, each power converter stage comprising a transformer that electromagnetically couples a primary side and a secondary side of the power converter stage. The primary side of the first power converter stage further comprises n-type metal oxide semiconductor field effect transistors (MOSFETs) $T1_A$ and $T3_A$, a capacitor C1 coupled to switching element $T1_A$, and a capacitor C2 coupled to capacitor C1 and to the switching element $T3_A$, where the transformer of the first power converter stage is coupled to and between a node between the n-type MOSFETs $T1_A$ and $T3_A$ and a node between the capacitors C1 and C2. The primary side of the second power converter stage further comprises n-type MOSFETs $T2_A$ and $T4_A$, a capacitor C3 coupled to switching element $T2_A$, and a capacitor C4 coupled to capacitor C3 and to the switching element $T4_A$, where the transformer of the second power converter stage is coupled to and between a node between the n-type MOSFETs $T2_A$ and $T4_A$ and a node between the capacitors C3 and C4. The secondary side of the first power converter stage further comprises output inductors L1 and L3 coupled to an output load and a first rectifier circuit comprising n-type MOSFETs B1 and B3 coupled to and between output inductors L1 and L3, respectively, and ground. The secondary side of the second power converter stage further comprises output inductors L2 and L4 coupled to the output load and a second rectifier circuit comprising n-type MOSFETs B2 and B4 coupled to and between the output inductors L2 and L4, respectively, and ground.

In accordance with yet another example of the disclosure, a system comprises first and second power converter stages, each power converter stage comprising a transformer that electromagnetically couples a primary side and a secondary side of the power converter stage. The primary side of the first power converter stage further comprises n-type metal oxide semiconductor field effect transistors (MOSFETs) $T1_A$, $T3_A$, $T1_B$, and $T3_B$ and capacitor C1, wherein C1, the combination of $T1_A$ and $T3_A$, and the combination of $T1_B$ and $T3_B$ are arranged in parallel, and wherein the transformer of the first power converter stage is coupled to and between a node between the n-type MOSFETs $T1_A$ and $T3_A$ and a node between the n-type MOSFETs $T1_B$ and $T3_B$. The primary side of the second power converter stage further comprises n-type MOSFETs $T2_A$, $T4_A$, $T2_B$, and $T4_B$ and capacitor C2, wherein C2, the combination of $T2_A$ and $T4_A$, and the combination of $T2_B$ and $T4_B$ are arranged in parallel, and wherein the transformer of the second power converter stage is coupled to and between a node between the n-type MOSFETs $T2_A$ and $T4_A$ and a node between the n-type MOSFETs $T2_B$ and $T4_B$. The secondary side of the first power converter stage further comprises output inductors L1 and L3 coupled to an output load and a first rectifier circuit comprising n-type MOSFETs B1 and B3 coupled to and between output inductors L1 and L3, respectively, and ground. The secondary side of the second power converter stage further comprises output inductors L2 and L4 coupled to the output load and a second rectifier circuit comprising n-type MOSFETs B2 and B4 coupled to and between the output inductors L2 and L4, respectively, and ground.

BRIEF DESCRIPTION OF THE DRAWINGS

For a detailed description of various examples, reference will now be made to the accompanying drawings in which.

DETAILED DESCRIPTION

A datacenter includes many servers, or blade servers, housed in various cabinets or chassis within a cabinet. Each blade server includes one or more central processing units (CPUs), which require power for operation. The datacenter receives alternating current (AC) power, and various power supply units or power converters convert the AC power to direct current (DC) power, and eventually to a DC voltage level appropriate for the CPUs of the blade servers. In some cases, the DC voltage level appropriate for a CPU is on the order of 1.7-1.8V.

As processing demands on blade servers, and their CPUs, increases, the power required by those devices increases as well. In a conventional datacenter, 12V DC power is supplied to a server blade, which includes an input power converter that converts the 12V DC to about 1.7-1.8V DC for provision to the CPU(s) of the server blade. However, for the same amount of power delivery, 12V DC power delivery requires thicker and more costly power cables relative to a higher-voltage power delivery such as, for example, 48V DC. Further, for a given power delivery to a server chassis, a lower input voltage results in an increased current, and thus higher $I^2R$ power losses, as well as additional thermal inefficiency. While it is thus beneficial to deliver power to server chassis at a higher voltage, such as 48V DC, conventional power converter topologies are less efficient when converting from 48V DC to 1.7-1.8V DC. Further, multi-stage conversion (e.g., using a first converter to convert 48V DC to 12V DC, and a second converter to convert from 12V DC to 1.7-1.8V DC) also sacrifices efficiency due to energy loss at each stage of the conversion process.

Examples of the present disclosure leverage a power converter topology that efficiently converts a relatively higher voltage, such as 48V DC, to a voltage appropriate for a CPU, such as about 1.7-1.8V DC in a single stage, and without the inefficiencies inherent in conventional power converter topologies. In particular, power converter topologies are described that employ multiple power converter stages, in which the input switching elements are arranged to reduce the amount of voltage seen by any one switching element at a given time and allowing those switching elements to be sized for a lower voltage than conventional topologies would permit. Further, the output current-generating elements, such as output inductors, of the power converter stages are arranged to provide sufficient current to the load, such as the CPU(s) of a blade server. These topologies will be described in further detail below, with reference to the accompanying figures.

Figure 1:
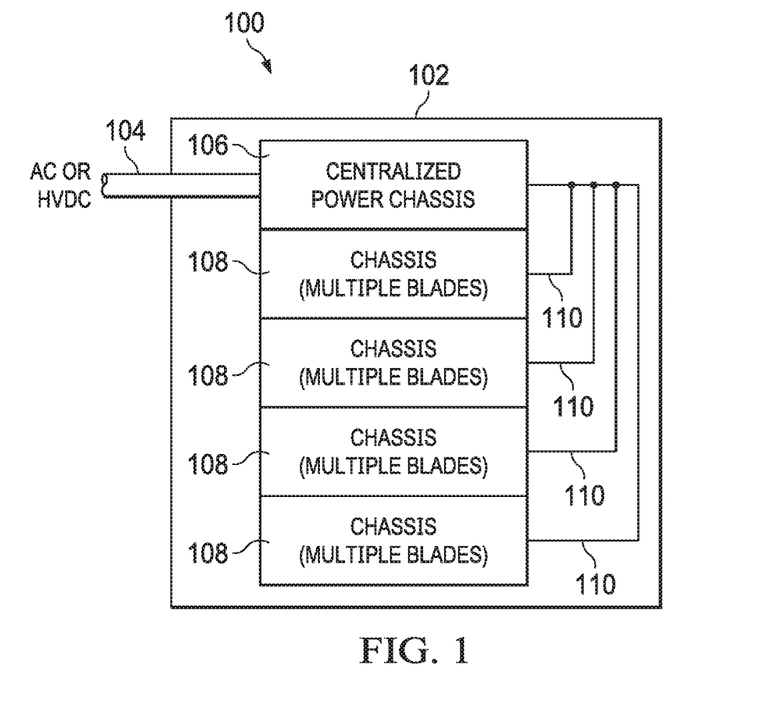
FIG. 1 shows a block diagram of a server rack cabinet in accordance with an example.

FIG. 1 shows a datacenter 100 including a rack cabinet 102. Power is supplied to the rack cabinet 102 by way of cable 104. In some examples, the cable 104 supplies AC power, while in other examples the cable 104 supplies high-voltage DC power (e.g., on the order of 200-600V or more). The rack cabinet 102 includes a centralized power chassis 106, which converts the AC power, or steps down the high-voltage DC power, to a voltage level for distribution to the server chassis 108 housed within the rack cabinet 102.

As explained above, conventionally the centralized power chassis 106 provides 12V DC power to the server chassis 108. However, this results in power cables 110 being larger and more expensive to handle the correspondingly higher current for a given power delivery requirement. Similarly, for a given power delivery requirement, a lower voltage such as 12V DC will require a higher current, and thus greater $I^2R$ power loss and thermal inefficiencies. Examples of the present disclosure provide a power converter that will convert a high voltage, such as 48V DC, to a CPU-level voltage, or approximately 1.7-1.8V DC, which allows the power cables 110 to be thinner and less expensive. Additionally, the $I^2R$ power loss of the power cables 110 is reduced.

Figure 2A:
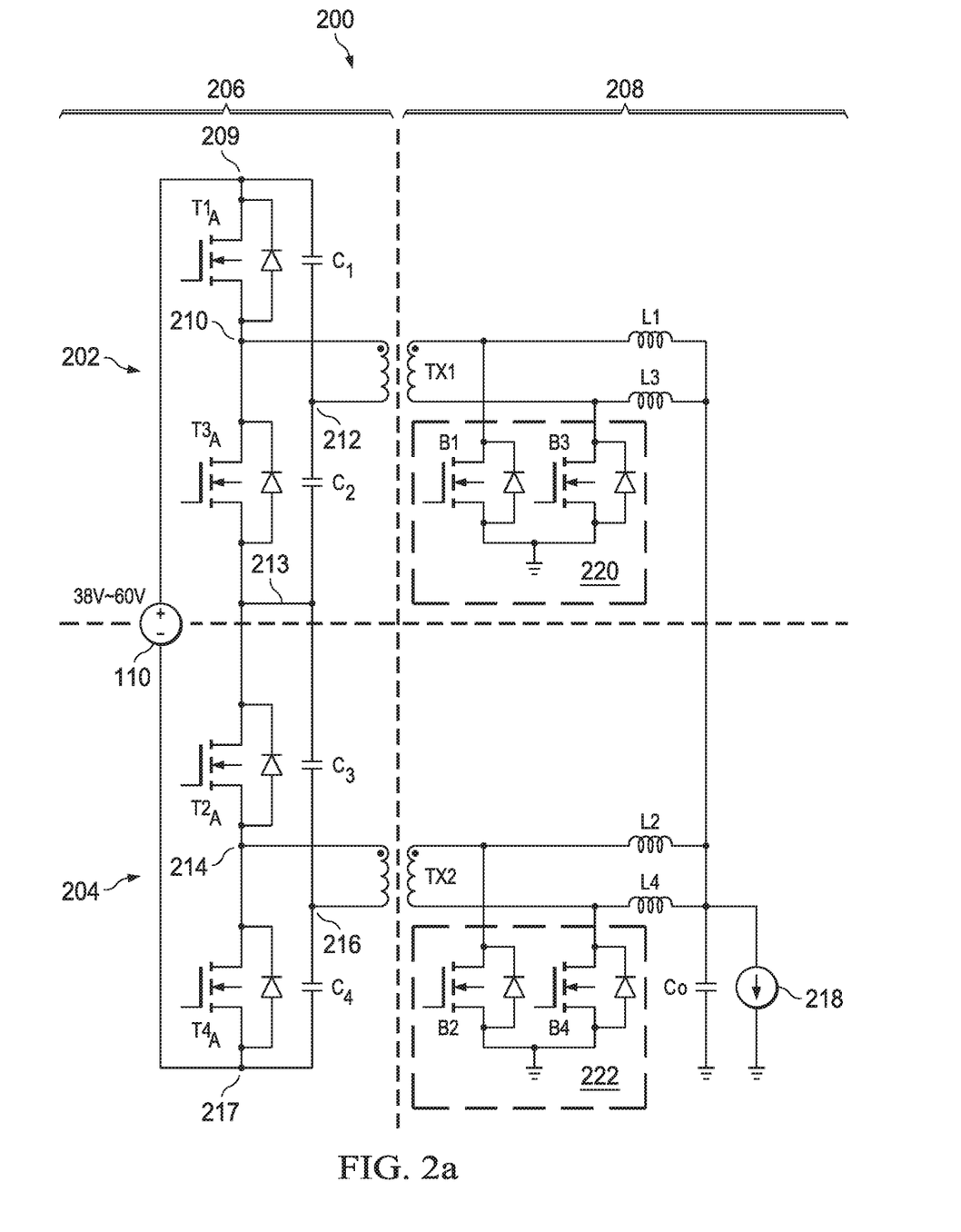
FIG. 2a shows a circuit schematic diagram of a serial input power converter employing a half-bridge topology in accordance with an example.

FIG. 2a shows a circuit schematic diagram of a serial input power converter employing a half bridge topology 200. The half-bridge serial input power converter 200 exists, for example, as part of a server blade as its input power converter that converts a DC voltage to a level appropriate for provision to CPU(s) of the server blade. The half-bridge serial input power converter 200 includes a first power converter stage 202 and a second power converter stage 204. Each stage 202, 204 includes a primary side 206 electromagnetically coupled to a secondary side 208 by way of transformers TX1 and TX2, respectively. The primary side 206 of the half-bridge serial power converter 200 is provided with a voltage source, for example by way of power cables 110 shown in FIG. 1. As explained, this is a relatively high-voltage DC voltage source, for example on the order of 38-60V; conventional input power converters for a blade server are designed to convert lower voltage DC voltage sources, on the order of 12V.

The primary side 206 of the first power converter stage 202 includes switching elements $T1_A$ and $T3_A$, which are, for example, n-type metal oxide semiconductor field effect transistors (MOSFETs). The primary side 206 of the second power converter stage 204 similarly includes switching elements $T2_A$ and $T4_A$, which are, for example, n-type MOSFETs. The switching element $T1_A$ is coupled to a positive terminal of the voltage source 110 at a node 209 and to the switching element $T3_A$, which is in turn coupled to the switching element $T2_A$, which is in turn coupled to the switching element $T4_A$, which is in turn coupled to a negative terminal of the voltage source 110 at a node 217. The primary sides 206 of the first and second power converter stages 202, 204 also include capacitors C1, C2, C3, and C4, as well as primary windings of transformers TX1 and TX2. The capacitor C1 is coupled to the switching element $T1_A$ at the node 209 and a node 212, while the capacitor C2 is coupled to the node 212 and to a node 213 between the switching elements $T3_A$ and $T2_A$. Similarly the capacitor C3 is coupled to the node 213 and a node 216, while the capacitor C4 is coupled to the node 216 and to the node 217. The primary windings of transformer TX1 are coupled to and between a node 210 between the switching elements $T1_A$ and $T3_A$ and the node 212. The primary windings of transformer TX2 are coupled to and between a node 214 between the switching elements $T2_A$ and $T4_A$ and the node 216.

The secondary side 208 of the first power converter stage 202 includes output inductors L1 and L3, which are coupled to an output load 218 and a rectifier circuit 220. The rectifier circuit 220 includes, for example, n-type MOSFETs B1 and B3, coupled to and between L1 and L3, respectively, and ground. The secondary side 208 of the second power converter stage 204 includes output inductors L2 and L4, which are also coupled to the output load 218 and a rectifier circuit 222. The rectifier circuit 222 includes, for example, n-type MOSFETs B2 and B4, coupled to and between L2 and L4, respectively, and ground. Secondary windings of transformers TX1 and TX2 are coupled to the output inductors L1/L3 and L2/L4, respectively. In some cases, the output inductors L1, L3, L2, and L4 are integrated as a part of their associated transformer.

Figure 2B:
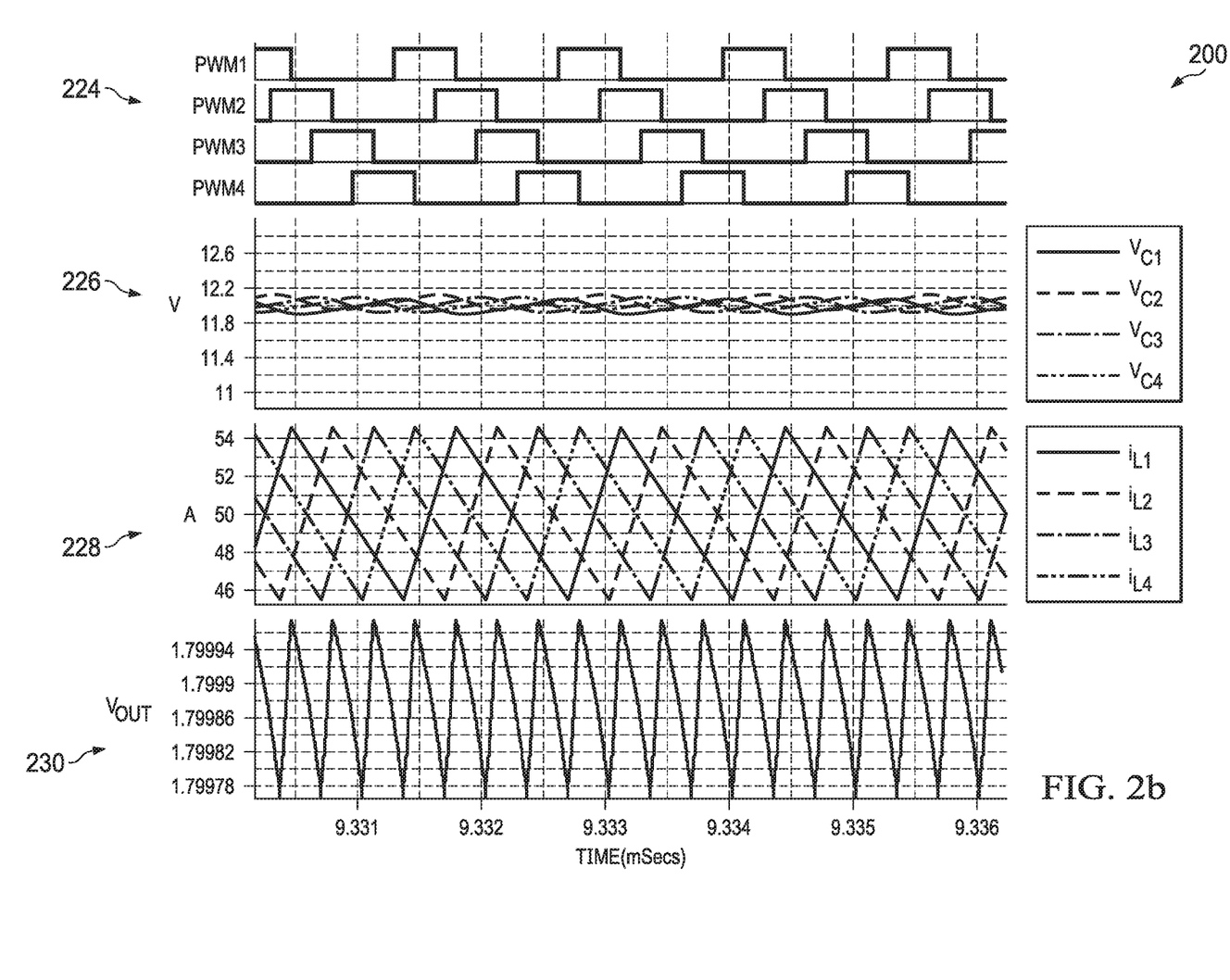
FIG. 2b shows various waveforms of control signals, voltages, and currents associated with the half-bridge serial input power converter of FIG. 2a in accordance with an example.

FIG. 2b shows various waveforms of control signals, voltages, and currents associated with the half-bridge serial input power converter 200 of FIG. 2a. In particular, the first set of waveforms 224 shows gate control signals PWM1-4, which control the gates of switching elements $T1_A$-$T4_A$, respectively. The gates of switching elements B1-B4 are controlled by the complements of PWM1-4. That is, when PWM1 is "high" and T1$_A$ is thus on, B1 is off; similarly, when PWM1 is "low" and T1A is thus off, B1 is on. The same applies for the remaining switching elements B2-B4. As shown, the switching elements in each pair of switching elements (e.g., T1$_A$/T3$_A$, T2$_A$/T4$_A$) are turned on approximately 180 degrees out of phase from one another, and a delay of approximately 90 degrees is provided for PWM1-4, in order.

During operation, the voltages across capacitors C1-C4 are balanced and approximately equal to Vin/4 (e.g., one-fourth of the voltage provided by the voltage source 110 in FIG. 2a). As shown in the second set of waveforms 226, in the example where Vin is 48V, the voltage across capacitors C1-C4 is approximately 12V. Referring to PWM1, when switching element T1$_A$ is turned on, a voltage of approximately Vin/4 is applied to the primary side of transformer TX1, which induces a voltage across the secondary side of transformer TX1, charging inductor L1 and causing a current through L1 to increase linearly as shown in the third set of waveforms 228. When T1$_A$ is turned off by PWM1, current through the primary side of transformer TX1 shuts off. Further, because B1 is operated by the complementary signal of PWM1, B1 is turned on and serves as a rectifier by providing a current path to ground. While B1 is turned on, the inductor L1 is discharging to the output load 218, and the inductor current drops linearly as shown in the third set of waveforms 228.

PWM3 operates to turn on switching element T3$_A$ while T1$_A$ is turned off, applying a voltage of approximately Vin/4 to the primary side of transformer TX1, but in the opposite direction relative to the voltage applied while T1$_A$ is on and T3$_A$ is off. This causes a current through L3 to increase linearly as shown in the third waveform 228. When T3$_A$ is turned off by PWM3, current through the primary side of transformer TX1 shuts off. Further, because B3 is operated by the complementary signal of PWM3, B3 is turned on and serves as a rectifier by providing a current path to ground. While B3 is turned on, the inductor L3 is discharging to the output load 218, and the inductor current drops linearly as shown in the third set of waveforms 228. For the sake of simplicity, reference is only made to the first power converter stage 202; however, the second power converter stage 204 mirrors the first power converter stage 202, differing only in the fact that the gate control signals PWM2 and PWM4 are offset from the gate control signals PWM1 and PWM3, as shown in the first set of waveforms 224. The inductor currents are thus operated in an interleaving manner to reduce output ripple. The output load 218 voltage is shown in the fourth waveform 230.

In some examples, the half-bridge serial input power converter 200 includes additional power converter stages arranged similarly to the first and second power converter stages 202, 204. Including additional power converter stages allows the input voltage to be further divided, which results in the various switching elements to be sized for a smaller fraction of the input voltage.

Figure 3A:
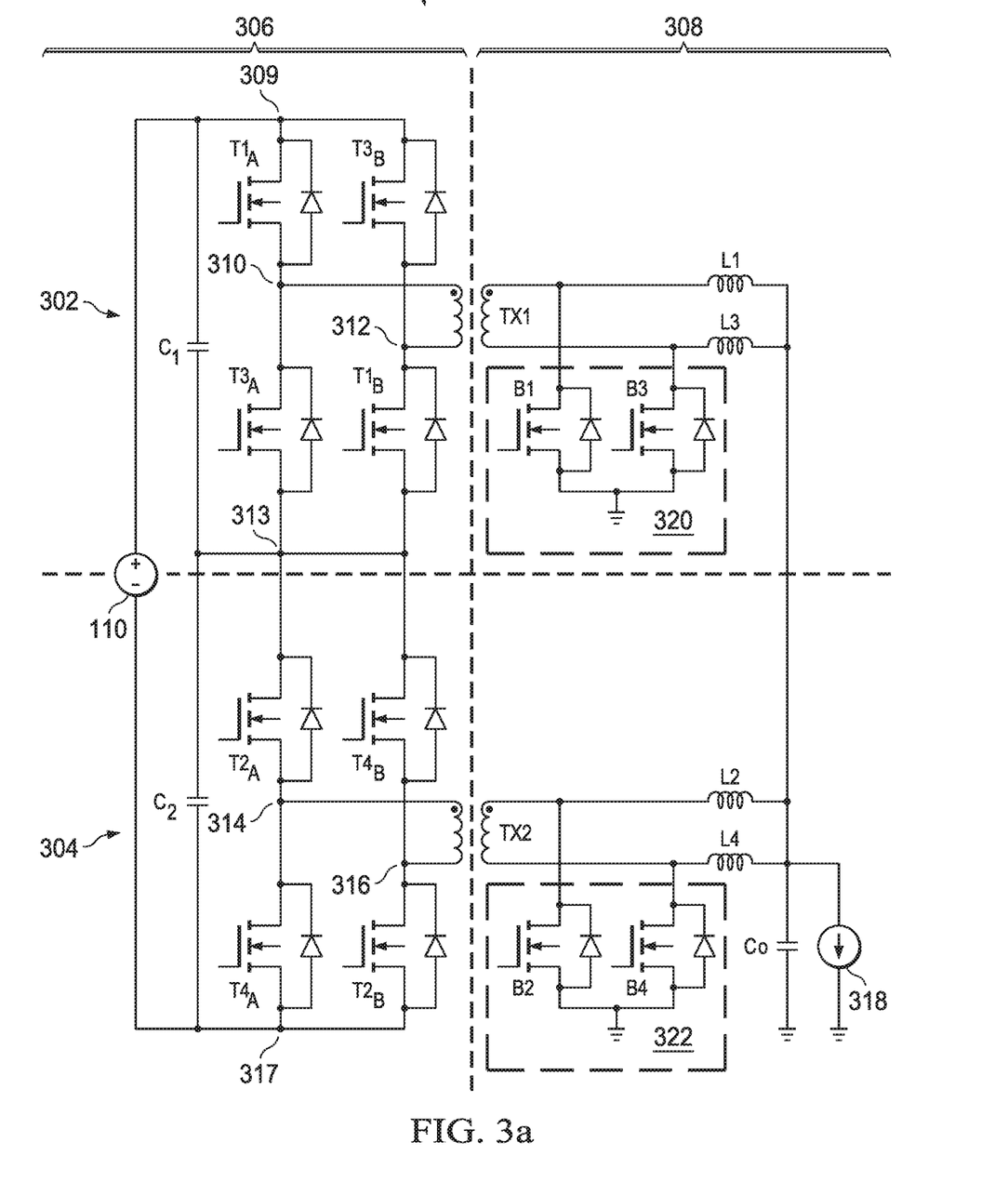
FIG. 3a shows a circuit schematic diagram of a serial input power converter employing a full-bridge topology in accordance with an example.

FIG. 3a shows a circuit schematic diagram of a serial input power converter employing a full bridge topology 300. The full-bridge serial input power converter 300 exists, for example, as part of a server blade as its input power converter that converts a DC voltage to a level appropriate for provision to CPU(s) of the server blade. The full-bridge serial input power converter 300 includes a first power converter stage 302 and a second power converter stage 304. Each stage 302, 304 includes a primary side 306 electromagnetically coupled to a secondary side 308 by way of transformers TX1 and TX2, respectively. The primary side 306 of the full-bridge serial power converter 300 is provided with a voltage source, for example by way of power cables 110 shown in FIG. 1. The secondary side 308 of the full-bridge serial power converter 300 is identical to that shown in and described with respect to FIG. 2a, above.

The primary side 306 of the first power converter stage 302 includes switching elements T1$_A$ and T3$_A$, as well as switching elements T1$_B$ and T3$_B$. The primary side 306 of the second power converter stage 304 similarly includes switching elements T2$_A$ and T4$_A$, as well as switching elements T2$_B$ and T4$_B$. As above, the switching elements are, for example, n-type MOSFETs. The switching element T1$_A$ is coupled to a positive terminal of the voltage source 110 at a node 309 and to the switching element T3$_A$, which is in turn coupled to the switching element T2$_A$ at a node 213, which is in turn coupled to the switching element T4$_A$, which is in turn coupled to a negative terminal of the voltage source 110 at a node 317. The switching element T1$_B$ is also coupled to the node 309 and to a node 312, while the switching element T3$_B$ is coupled to the node 312 and to the node 313. Similarly, the switching element T2$_B$ is coupled to the node 313 and a node 316, while the switching node T4$_B$ is coupled to the node 316 and the node 317. The primary sides 306 of the first and second power converter stages 302, 304 also include capacitors C1 and C2, respectively; the capacitor C1 is coupled to the node 309 and the node 313, while the capacitor C2 is coupled to the node 313 and the node 317. The primary windings of transformer TX1 are coupled to and between a node 310 between the switching elements T1$_A$ and T3$_A$ and the node 312 between the switching elements T1$_B$ and T3$_B$. The primary windings of transformer TX2 are coupled to and between a node 314 between the switching elements T2$_A$ and T4$_A$ and the node 316 between the switching elements T2$_B$ and T4$_B$.

Figure 3B:
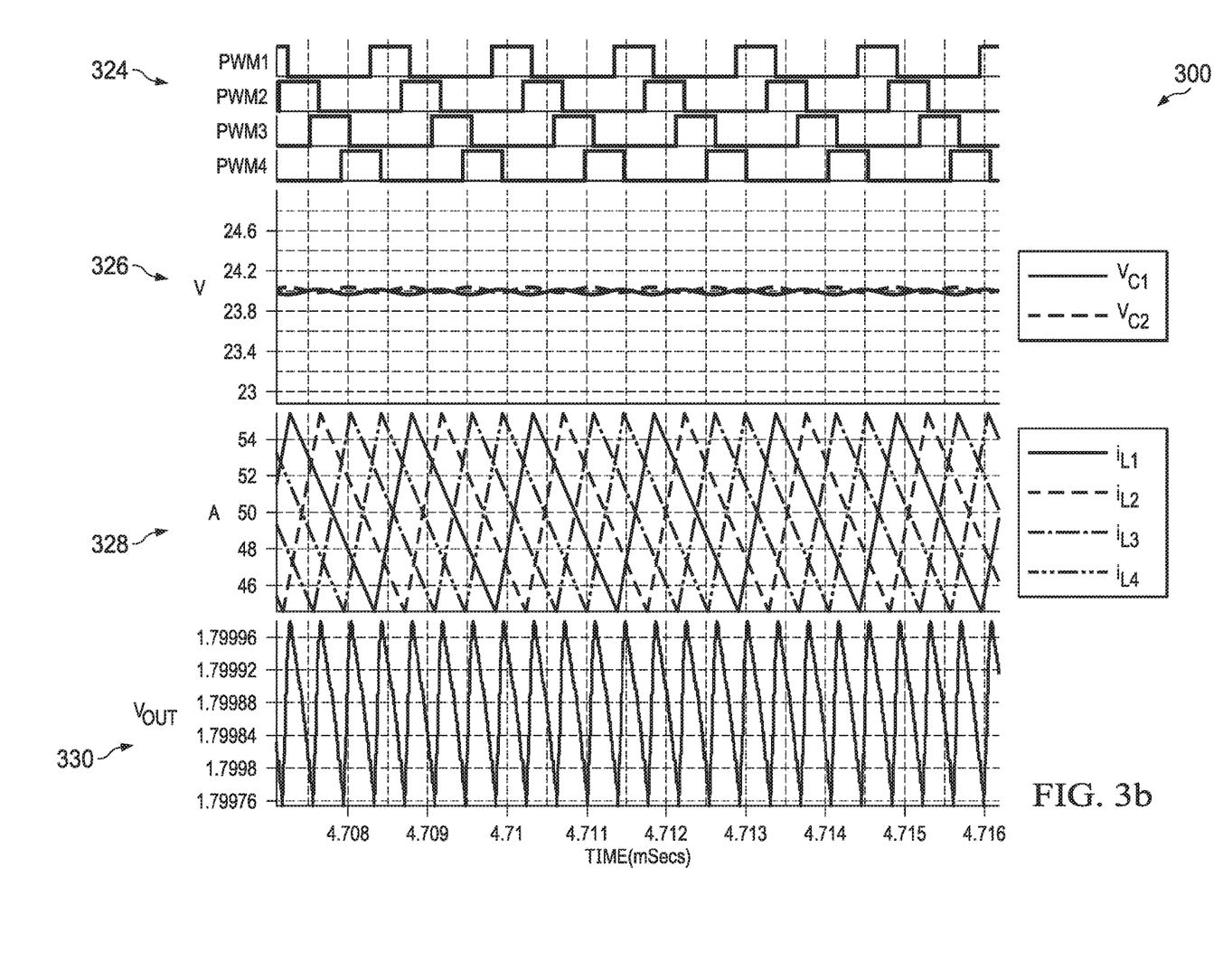
FIG. 3b shows various waveforms of control signals, voltages, and currents associated with the full-bridge serial input power converter of FIG. 3a in accordance with an example.

FIG. 3b shows various waveforms of control signals, voltages, and currents associated with the full-bridge serial input power converter 300 of FIG. 3a. The waveforms are similar to those shown in and described with respect to FIG. 2b. However, with respect to the first set of waveforms 324, the gate control signals PWM1-4 additionally control the gates of switching elements T1$_B$-T4$_B$, respectively. Additionally, the voltage across capacitors C1 and C2 is approximately equal to Vin/2, as shown in the second set of waveforms 326. Thus, when PWM1 turns on T1$_A$ and T1$_B$, a voltage of approximately Vin/2 is applied to the primary side of transformer TX1 (as opposed to approximately Vin/4 in the half-bridge example above). The remaining functionality of the full-bridge serial input power converter 300 is similar to that described above with respect to the half-bridge serial input power converter 200, and thus the third set of waveforms 328 and the fourth waveform 330 are similar to 228 and 230, described above with respect to FIG. 2b.

As explained, the input switching elements T1$_A$-T4$_A$ of the half-bridge serial input power converter 200 (as well as the input switching elements T1$_B$-T4$_B$ in the case of the full-bridge serial input power converter 300) are coupled such that each of the input switching elements T1$_A$-T4$_A$ only sees approximately one-quarter of the input voltage 110, rather than one-half as would be the case if only a single power converter stage was employed. This allows input switching elements T1$_A$-T4$_A$ to have a lower-voltage rating and a higher switching frequency, resulting in lower switching losses and higher efficiency and power density. The above examples of half- and full-bridge serial input power converters 200, 300 may be extended to include additional stages, further reducing the voltage applied to a given switching element, and/or allowing for a higher DC voltage conversion ratio. Further, when compared to a multi-stage approach, for example stepping down from 48V to 10V and then from 10V to approximately 1.7-1.8V, the disclosed half- and full-bridge serial input power converters 200, 300 improve energy conversion efficiency, since energy is only converted once, and thus only subjected to one conversion loss factor. On the other hand, a multi-stage approach results in the application of multiple such conversion loss factors that have a greater impact on overall efficiency.

In some examples, the full-bridge serial input power converter 300 includes additional power converter stages arranged similarly to the first and second power converter stages 302, 304. Including additional power converter stages allows the input voltage to be further divided, which results in the various switching elements to be sized for a smaller fraction of the input voltage.

Figure 4A:
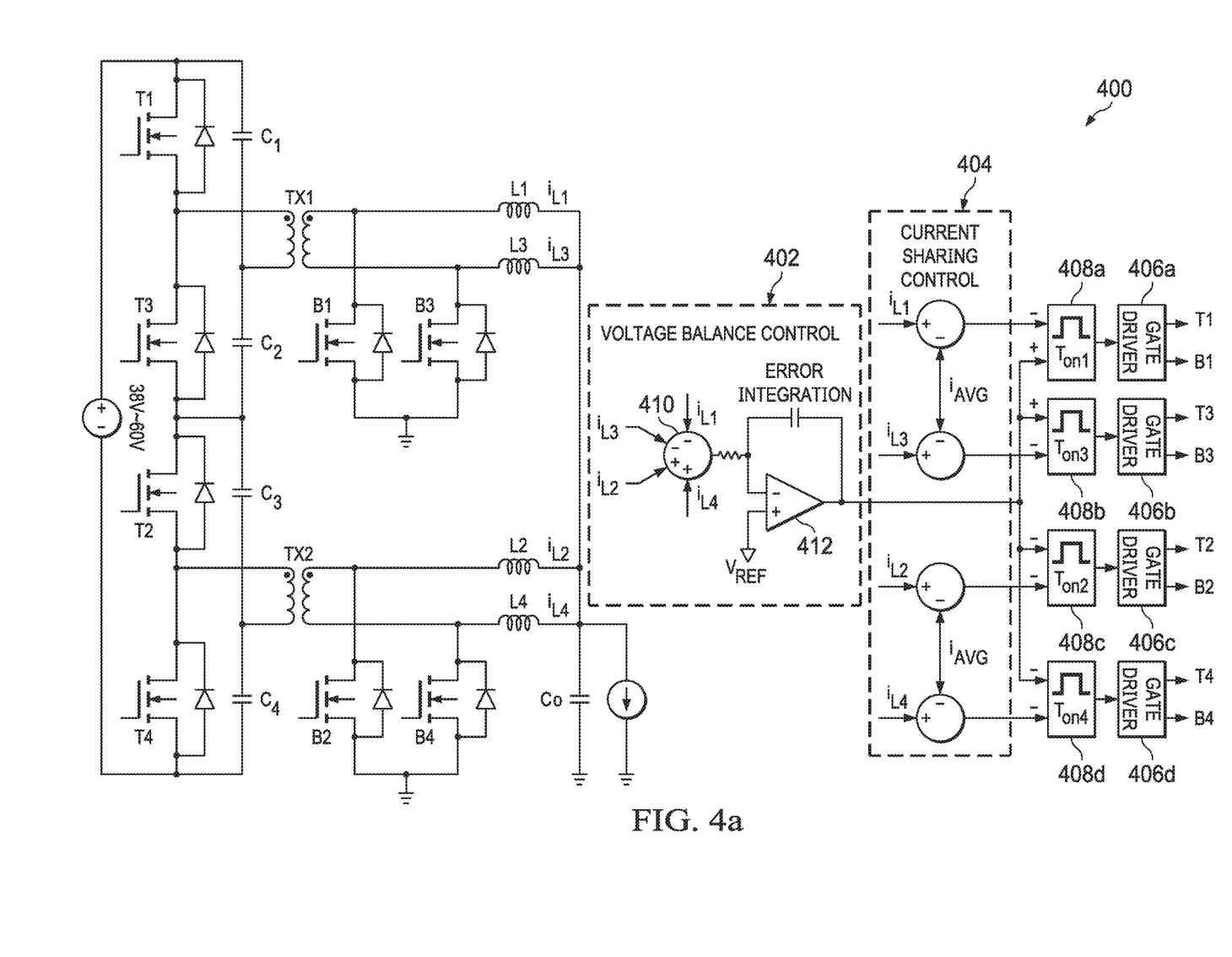
FIG. 4a shows a circuit schematic diagram of a control scheme for the half- and full-bridge serial input power converters of FIGS. 2a and 3a, respectively, in accordance with an example.

In an example, FIG. 4a depicts a circuit schematic diagram of a control scheme for the half- and full-bridge serial input power converters 200, 300. A control circuit 400 includes a voltage balance control section 402 and a current sharing control section 404, which receive as inputs values of the currents through inductors L1-L4, as well as the average of the currents through inductors L1-L4. For example, the switching elements B1-B4 sense the current through inductors L1-L4, respectively, as a voltage value. In this example, the control circuit 400 also includes an average circuit (not shown) that calculates an average of the sensed current voltage values, which can then be used by the current sharing control section 404. The foregoing is one example of a current sensing and averaging implementation, but the scope of the present disclosure is not limited to any such particular implementation.

The control circuit 400 couples to or includes gate drivers 406, as well as gate driver controllers 408, which alter the time or duration that the input signals to the gate drivers 406 (e.g., PWM1-4, above) are on/off. The gate driver controllers 408 produce an output signal that corresponds to one of the PWM signals explained above. In response to a positive voltage on a positive (denoted '+') input, the gate driver controller 408 increases an on time of its output signal. Similarly, in response to a positive voltage on a negative (denoted '−') input, the gate driver controller 408 decreases an on time of its output signal. In response to a negative voltage on either input, the effect is the opposite of the positive voltages described above. The gate drivers 406 represent a circuit that is used to generate MOSFET drive signals, since the original PWM pulse signal from the gate driver controllers 408 is not powerful enough to drive a power MOSFET. As shown, the gate drivers 406 produce a 'T' output and a 'B' output, which, as explained above, are complementary signals to control the primary side 'T' switching elements and the secondary side 'B' switching elements, respectively. For purposes of simplicity, reference to on/off times is with respect to the 'T' switching elements. Further, although shown in relation to a half-bridge serial input power converter, the control circuit 400 can also be employed with a full-bridge serial input power converter and, in that case, for example, the 'T1' output of gate driver 406 is applied to both $T1_A$ and $T1_B$.

The current sharing control section 404 subtracts the average inductor current from the current through each of the individual output inductors L1-L4. If the current through the individual output inductor (e.g., L1) is greater than the average, the associated gate driver controller 408 decreases the on time of the associated switching element (e.g., $T1_A$), which results in the output inductor L1 being charged for less time, and discharged for more time, reducing the current of that output inductor L1. Conversely, if the current through the individual output inductor L1 is less than the average, the associated gate driver controller 408 increases the on time of the associated switching element $T1_A$, which results in the output inductor L1 being charged for more time, and discharged for less time, increasing the current of that output inductor L1. The current sharing control section 404 balances the voltage across the capacitors C1 and C2 in the first stage, and across the capacitors C3 and C4 in the second stage, but does not balance voltage between stages, for example between capacitors C1 and C3, or C2 and C4, which may differ due to variations in the turn ratios of TX1 and TX2.

The voltage balance control section 402 compares a sum of currents through output inductors L1 and L3 to a sum of currents through output inductors L2 and L4 by subtracting the L1 and L3 currents from the L2 and L4 currents using a summation circuit 410, and comparing the result to ground or a reference voltage using an operational amplifier (op-amp) integrator 412. For example, if a secondary:primary turn ratio of TX1 is greater than that of TX2, then the voltage across the capacitors C1 and C2 will be greater than that across the capacitors C3 and C4, and the sum of currents through output inductors L1 and L3 will be greater than the sum of currents through output inductors L2 and L4. As a result of the sum of currents through output inductors L1 and L3 being greater than the sum of currents through output inductors L2 and L4, the output of the summation circuit 410 is negative and the negative terminal of the op-amp integrator 412 is less than ground, and thus the output of the op-amp integrator 412 is a positive voltage (that is proportional to the difference between quantities compared by the summation circuit 410, or to the difference between the terminals of the op-amp integrator 412), which causes the gate driver controllers 408a, 408b to increase the on time of T1 and T3, which in turn decreases the voltage across the capacitors C1 and C2. The positive voltage output of the op-amp integrator 412 also causes the gate driver controllers 408c, 408d to decrease the on time of T2 and T4, which in turn increases the voltage across the capacitors C3 and C4.

On the other hand, if a secondary:primary turn ratio of TX1 is less than that of TX2, then the voltage across the capacitors C1 and C2 will be less than that across the capacitors C3 and C4, and the sum of currents through output inductors L1 and L3 will be less than the sum of currents through output inductors L2 and L4. As a result of the sum of currents through output inductors L1 and L3 being less than the sum of currents through output inductors L2 and L4, the output of the summation circuit 410 is positive and the negative terminal of the op-amp integrator 412 is greater than ground, and thus the output of the op-amp integrator 412 is a negative voltage, which causes the gate driver controllers 408a, 408b to decrease the on time of T1 and T3, which in turn increases the voltage across the capacitors C1 and C2. The negative voltage output of the op-amp integrator 412 also causes the gate driver controllers 408c, 408d to increase the on time of T2 and T4, which in turn decreases the voltage across the capacitors C3 and C4. As a result of the adjustment of duty cycles of T1/T3 and T2/T4 by the voltage balance control section 402, voltages are balanced between the stages of the half- and full-bridge serial input power converters.

Figure 4B:
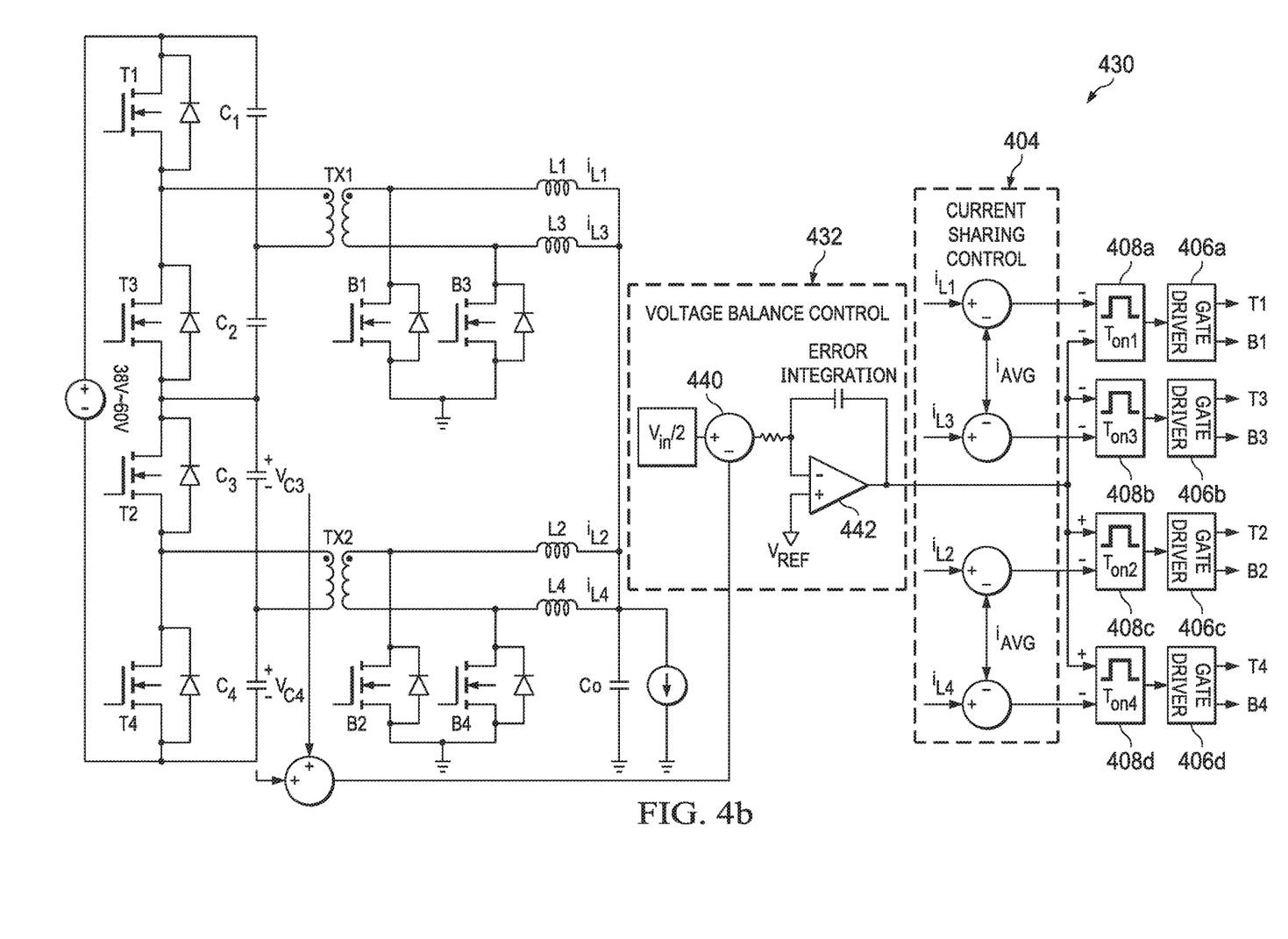
FIG. 4b shows a circuit schematic diagram of another control scheme for the half-bridge serial input power converter of FIG. 2a in accordance with an example.

FIG. 4b shows a circuit schematic diagram of another example control scheme for the half-bridge serial input power converter 200. A control circuit 430 includes a current sharing control section 404, gate drivers 406, and gate driver controllers 408, which are identical in function to those shown in and described with respect to FIG. 4a, except that certain inputs to the gate driver controllers 408 have different signs. A voltage balance control section 432 differs from that in FIG. 4a, however, in that it compares a sum of voltages across the capacitors C3 and C4 to Vin/2 by subtracting the C3 and C4 voltages from Vin/2 using a summation circuit 440, and comparing the result to ground or a reference voltage using an op-amp integrator 442. As explained above, if a secondary:primary turn ratio of TX1 is greater than that of TX2, then the voltage across the capacitors C1 and C2 will be greater than that across the capacitors C3 and C4, and thus the voltage across the capacitors C3 and C4 will be less than Vin/2. As a result of the voltage across the capacitors C3 and C4 being less than Vin/2, the output of the summation circuit 440 is positive and the negative terminal of the op-amp integrator 442 is greater than ground, and thus the output of the op-amp integrator 442 is a negative voltage, which causes the gate driver controllers 408a, 408b to increase the on time of T1 and T3, which in turn decreases the voltage across the capacitors C1 and C2. The positive voltage output of the op-amp integrator 442 also causes the gate driver controllers 408c, 408d to decrease the on time of T2 and T4, which in turn increases the voltage across the capacitors C3 and C4.

On the other hand, if a secondary:primary turn ratio of TX1 is less than that of TX2, then the voltage across the capacitors C1 and C2 will be less than that across the capacitors C3 and C4, and thus the voltage across the capacitors C3 and C4 will be greater than Vin/2. As a result of the voltage across the capacitors C3 and C4 being greater than Vin/2, the output of the summation circuit 440 is negative and the negative terminal of the op-amp integrator 442 is less than ground, and thus the output of the op-amp integrator 442 is a positive voltage, which causes the gate driver controllers 408a, 408b to decrease the on time of T1 and T3, which in turn increases the voltage across the capacitors C1 and C2. The negative voltage output of the op-amp integrator 442 also causes the gate driver controllers 408c, 408d to increase the on time of T2 and T4, which in turn decreases the voltage across the capacitors C3 and C4. As a result of the adjustment of duty cycles of T1/T3 and T2/T4 by the voltage balance control section 432, voltages are balanced between the stages of the half-bridge serial input power converter.

Figure 4C:
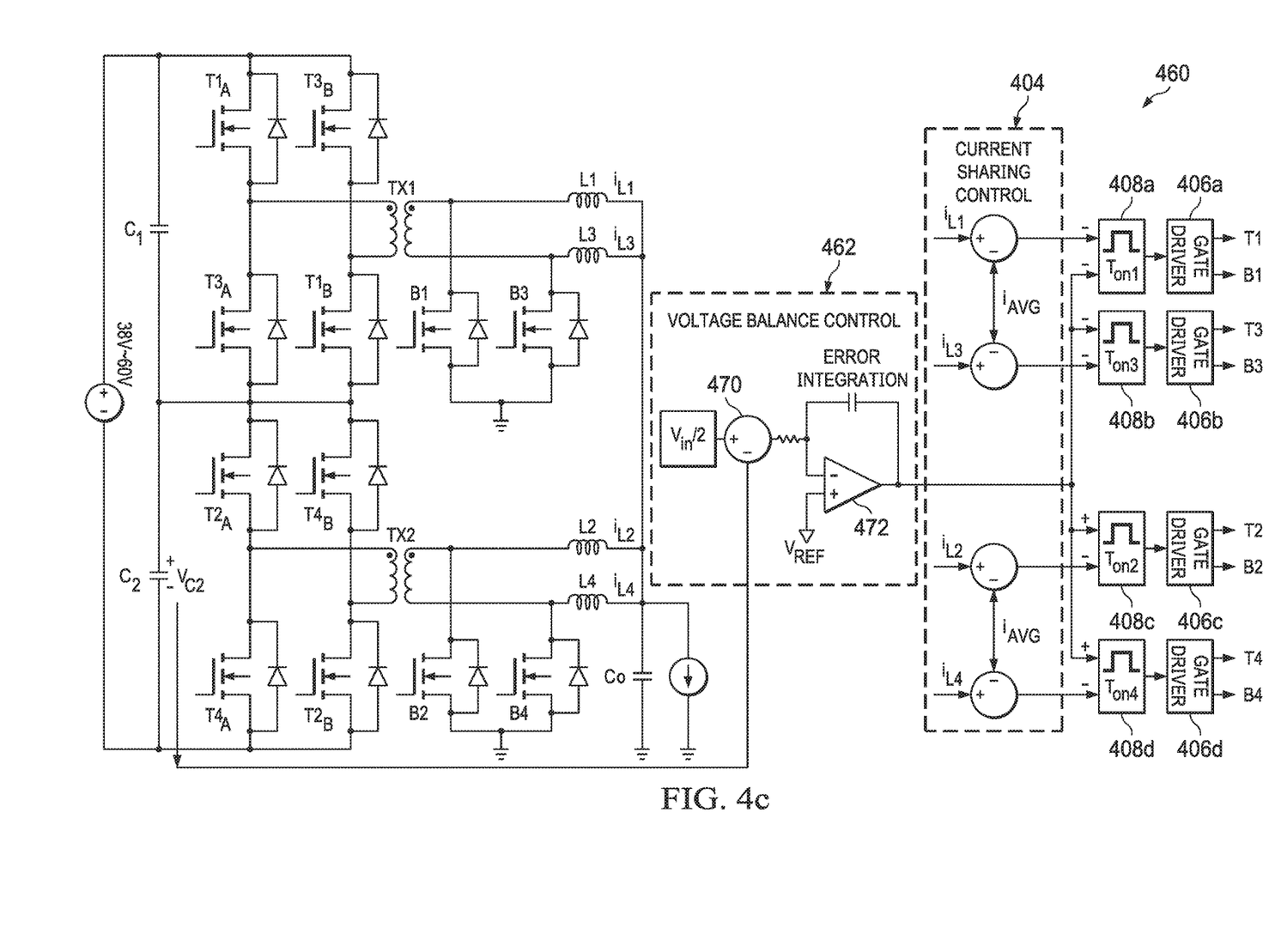
FIG. 4c shows a circuit schematic diagram of another control scheme for the full-bridge serial input power converter of FIG. 3a in accordance with an example.

FIG. 4c shows a circuit schematic diagram of another example control scheme for the full-bridge serial input power converter 300. A control circuit 460 includes a current sharing control section 404, gate drivers 406, and gate driver controllers 408, which are identical in function to those shown in and described with respect to FIG. 4a, except that certain inputs to the gate driver controllers 408 have different signs. The gate drivers 406 drive pairs of primary side 'T' switching elements, such as T1$_A$ and T1$_B$, in addition to the secondary side 'B' switching elements. A voltage balance control section 462 is similar to the voltage balance control section 432 of FIG. 4b, except that instead of comparing the sum of voltages across capacitors C3 and C4 to Vin/2 as in FIG. 4b, the voltage across capacitor C2 of the full-bridge serial input power converter 300 is compared to Vin/2 (by subtracting the C2 voltage from Vin/2 using summation circuit 470), since the full-bridge serial input power converter 300 only employs a single capacitor for each stage. The remaining functionality of the voltage balance control section 462 (including op-amp integrator 472) and the gate driver controllers 408 are as explained above, and as a result of the adjustment of duty cycles of T1/T3 and T2/T4 by the voltage balance control section 462, voltages are balanced between the stages of the full-bridge serial input power converter.

In the foregoing discussion and in the claims, reference is made to a serial input power converter employing either a half-bridge or a full-bridge topology, including multiple stages. It should be appreciated that the power converters and their stages, as the case may be, correspond to hardware circuitry, for example implemented on an integrated circuit (IC). Indeed, in at least one example, the serial input power converter is implemented on an IC.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means +/− 10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An apparatus comprising:
    first and second power converter stages, each power converter stage comprising a primary side and a secondary side;
    the primary side of the first power converter stage further comprises a switching element T1$_A$ coupled to a voltage source and a switching element T3$_A$ coupled to the switching element T1$_A$;
    the primary side of the second power converter stage further comprises a switching element T2$_A$ coupled to the switching element T3$_A$ and a switching element T4$_A$ coupled to the switching element T3$_A$ and to the voltage source; and
    a control circuit configured to control an on/off time of the switching elements, the control circuit comprising:
        four gate driver controllers, each configured to control the on/off time of one of switching elements T1$_A$, T2$_A$, T3$_A$, and T4$_A$; and a current sharing control section coupled to the gate driver controllers configured to:
compare a current through each of multiple output inductors on the secondary sides of the first and second power converter stages to an average current through the multiple output inductors; and
as a result of the current through one of the multiple output inductors being greater than the average current, decrease the on time of a corresponding switching element and, as a result of the current through the one of the multiple output inductors being less than the average current, increase the on time of the corresponding switching element.

2. The apparatus of claim 1 wherein:
the four gate driver controllers are further configured to control the on/off time of one of switching elements B1, B2, B3, and B4 on the secondary sides of the first and second power converter stages, and each gate driver controller is configured to control the on/off time of switching elements $T1_A$ and B1, $T2_A$ and B2, $T3_A$ and B3, and $T4_A$ and B4, respectively, in a complementary manner; and
the multiple output inductors comprise output inductors L1, L2, L3, and L4, and the current sharing control section is further configured to:
as a result of the current through L1 being greater than the average current, decrease the on time of $T1_A$ and, as a result of the current through L1 being less than the average current, increase the on time of $T1_A$;
as a result of the current through L3 being greater than the average current, decrease the on time of $T3_A$ and, as a result of the current through L3 being less than the average current, increase the on time of $T3_A$;
as a result of the current through L2 being greater than the average current, decrease the on time of $T2_A$ and, as a result of the current through L2 being less than the average current, increase the on time of $T2_A$; and
as a result of the current through L4 being greater than the average current, decrease the on time of $T4_A$ and, as a result of the current through L4 being less than the average current, increase the on time of $T4_A$.

3. The apparatus of claim 2 wherein the control circuit further comprises a voltage balance control section configured to:
compare a sum of currents through L1 and L3 to a sum of currents through L2 and L4;
as a result of the sum of currents through L1 and L3 being greater than the sum of currents through L2 and L4, increase the on time of $T1_A$ and $T3_A$ and decrease the on time of $T2_A$ and $T4_A$; and
as a result of the sum of currents through L1 and L3 being less than the sum of currents through L2 and L4, decrease the on time of $T1_A$ and $T3_A$ and increase the on time of $T2_A$ and $T4_A$.

4. The apparatus of claim 2 wherein:
the primary side of the first power converter stage further comprises a capacitor C1 coupled to switching element $T1_A$, and a capacitor C2 coupled to capacitor C1 and to the switching element $T3_A$;
the primary side of the second power converter stage further comprises a capacitor C3 coupled to switching element $T2_A$, and a capacitor C4 coupled to capacitor C3 and to the switching element $T4_A$;
the transformer of the first power converter stage is coupled to and between a node between the switching elements $T1_A$ and $T3_A$ and a node between the capacitors C1 and C2; and the transformer of the second power converter stage is coupled to and between a node between the switching elements $T2_A$ and $T4_A$ and a node between the capacitors C3 and C4.

5. The apparatus of claim 4 wherein the control circuit further comprises a voltage balance control section configured to:
compare a voltage across capacitors C3 and C4 to an input voltage divided by 2;
as a result of the voltage across capacitors C3 and C4 being less than the input voltage divided by 2, increase the on time of $T1_A$ and $T3_A$ and decrease the on time of $T2_A$ and $T4_A$; and
as a result of the voltage across capacitors C3 and C4 being greater than the input voltage divided by 2, decrease the on time of $T1_A$ and $T3_A$ and increase the on time of $T2_A$ and $T4_A$.

6. The apparatus of claim 2 wherein:
the primary side of the first power converter stage further comprises a switching element $T3_B$ coupled to the switching element $T1_A$, and a switching element $T1_B$ coupled to the switching element $T3_B$ and the switching element $T3_A$;
the primary side of the second power converter stage further comprises a switching element $T4_B$ coupled to the switching element $T2_A$, and a switching element $T2_B$ coupled to the switching element $T4_B$ and the switching element $T4_A$;
the transformer of the first power converter stage is coupled to and between a node between the switching elements $T1_A$ and $T3_A$ and a node between the switching elements $T1_B$ and $T3_B$; and
the transformer of the second power converter stage is coupled to and between a node between the switching elements $T2_A$ and $T4_A$ and a node between the switching elements $T2_B$ and $T4_B$;
wherein the gate driver controller that controls $T1_A$ also controls $T1_B$, the gate driver controller that controls $T3_A$ also controls $T3_B$, the gate driver controller that controls $T2_A$ also controls $T2_B$, and the gate driver controller that controls $T4_A$ also controls $T4_B$;
wherein each gate driver controller is configured to control the on/off time of the secondary side n-type MOSFETs in a complementary manner relative to the primary side n-type MOSFETs.

7. The apparatus of claim 6 wherein:
the primary side of the first power converter stage further comprises a capacitor C1 coupled to the switching elements $T1_A$ and $T3_A$; and
the primary side of the second power converter stage further comprises a capacitor C2 coupled to the switching elements $T2_A$ and $T4_A$.

8. The apparatus of claim 7 wherein the control circuit further comprises a voltage balance control section configured to:
compare a voltage across capacitor C2 to an input voltage divided by 2;
as a result of the voltage across capacitor C2 being less than the input voltage divided by 2, increase the on time of $T1_{A/B}$ and $T3_{A/B}$ and decrease the on time of $T2_{A/B}$ and $T4_{A/B}$; and
as a result of the voltage across capacitor C2 being greater than the input voltage divided by 2, decrease the on time of $T1_{A/B}$ and $T3_{A/B}$ and increase the on time of $T2_{A/B}$ and $T4_{A/B}$.

9. An apparatus comprising:
first and second power converter stages, each power converter stage comprising a transformer that electromagnetically couples a primary side and a secondary side of the power converter stage;
the primary side of the first power converter stage further comprises n-type metal oxide semiconductor field effect transistors (MOSFETs) $T1_A$ and $T3_A$, a capacitor C1 coupled to switching element $T1_A$, and a capacitor C2 coupled to capacitor C1 and to the switching element $T3_A$, wherein the transformer of the first power converter stage is coupled to and between a node between the n-type MOSFETs $T1_A$ and $T3_A$ and a node between the capacitors C1 and C2;
the primary side of the second power converter stage further comprises n-type MOSFETs $T2_A$ and $T4_A$, a capacitor C3 coupled to switching element $T2_A$, and a capacitor C4 coupled to capacitor C3 and to the switching element $T4_A$, wherein the transformer of the second power converter stage is coupled to and between a node between the n-type MOSFETs $T2_A$ and $T4_A$ and a node between the capacitors C3 and C4;
the secondary side of the first power converter stage further comprises output inductors L1 and L3 coupled to an output load and a first rectifier circuit comprising n-type MOSFETs B1 and B3 coupled to and between output inductors L1 and L3, respectively, and ground; and
the secondary side of the second power converter stage further comprises output inductors L2 and L4 coupled to the output load and a second rectifier circuit comprising n-type MOSFETs B2 and B4 coupled to and between the output inductors L2 and L4, respectively, and ground.

10. The apparatus of claim 9 further comprising a control circuit configured to control the on/off time of the n-type MOSFETs, the control circuit comprising:
four gate driver controllers, each configured to control the on/off time of one of:
n-type MOSFETs $T1_A$ and B1;
n-type MOSFETs $T3_A$ and B3;
n-type MOSFETs $T2_A$ and B2; and
n-type MOSFETs $T4_A$ and B4;
wherein each gate driver controller is configured to control the on/off time of its associated n-type MOSFETs in a complementary manner; and
a current sharing control section coupled to the gate driver controllers configured to:
compare a current through each output inductor to an average current through all output inductors;
as a result of the current through L1 being greater than the average current, decrease the on time of $T1_A$ and, as a result of the current through L1 being less than the average current, increase the on time of $T1_A$;
as a result of the current through L3 being greater than the average current, decrease the on time of $T3_A$ and, as a result of the current through L3 being less than the average current, increase the on time of $T3_A$;
as a result of the current through L2 being greater than the average current, decrease the on time of $T2_A$ and, as a result of the current through L2 being less than the average current, increase the on time of $T2_A$; and
as a result of the current through L4 being greater than the average current, decrease the on time of $T4_A$ and, as a result of the current through L4 being less than the average current, increase the on time of $T4_A$.

11. The apparatus of claim 10 wherein the control circuit further comprises a voltage balance control section configured to:
compare a sum of currents through L1 and L3 to a sum of currents through L2 and L4;
as a result of the sum of currents through L1 and L3 being greater than the sum of currents through L2 and L4, increase the on time of $T1_A$ and $T3_A$ and decrease the on time of $T2_A$ and $T4_A$; and
as a result of the sum of currents through L1 and L3 being less than the sum of currents through L2 and L4, decrease the on time of $T1_A$ and $T3_A$ and increase the on time of $T2_A$ and $T4_A$.

12. The apparatus of claim 10 wherein the control circuit further comprises a voltage balance control section configured to:
compare a voltage across capacitors C3 and C4 to an input voltage divided by 2;
as a result of the voltage across capacitors C3 and C4 being less than the input voltage divided by 2, increase the on time of $T1_A$ and $T3_A$ and decrease the on time of $T2_A$ and $T4_A$; and
as a result of the voltage across capacitors C3 and C4 being greater than the input voltage divided by 2, decrease the on time of $T1_A$ and $T3_A$ and increase the on time of $T2_A$ and $T4_A$.

13. An apparatus comprising:
first and second power converter stages, each power converter stage comprising a transformer that electromagnetically couples a primary side and a secondary side of the power converter stage;
the primary side of the first power converter stage further comprises n-type metal oxide semiconductor field effect transistors (MOSFETs) $T1_A$, $T3_A$, $T1_B$, and $T3_B$ and capacitor C1, wherein C1, the combination of $T1_A$ and $T3_A$, and the combination of $T1_B$ and $T3_B$ are arranged in parallel, and wherein the transformer of the first power converter stage is coupled to and between a node between the n-type MOSFETs $T1_A$ and $T3_A$ and a node between the n-type MOSFETs $T1_B$ and $T3_B$;
the primary side of the second power converter stage further comprises n-type MOSFETs $T2_A$, $T4_A$, $T2_B$, and $T4_B$ and capacitor C2, wherein C2, the combination of $T2_A$ and $T4_A$, and the combination of $T2_B$ and $T4_B$ are arranged in parallel, and wherein the transformer of the second power converter stage is coupled to and between a node between the n-type MOSFETs $T2_A$ and $T4_A$ and a node between the n-type MOSFETs $T2_B$ and $T4_B$;
the secondary side of the first power converter stage further comprises output inductors L1 and L3 coupled to an output load and a first rectifier circuit comprising n-type MOSFETs B1 and B3 coupled to and between output inductors L1 and L3, respectively, and ground; and
the secondary side of the second power converter stage further comprises output inductors L2 and L4 coupled to the output load and a second rectifier circuit comprising n-type MOSFETs B2 and B4 coupled to and between the output inductors L2 and L4, respectively, and ground.

14. The apparatus of claim 13 further comprising a control circuit configured to control the on/off time of the n-type MOSFETs, the control circuit comprising:
four gate driver controllers, each configured to control the on/off time of one of:

n-type MOSFETs $T1_A$, $T1_B$, and B1;
n-type MOSFETs $T3_A$, $T3_B$, and B3;
n-type MOSFETs $T2_A$, $T2_B$, and B2; and
n-type MOSFETs $T4_A$, $T4_B$, and B4;
  wherein each gate driver controller is configured to control the on/off time of the secondary side n-type MOSFETs in a complementary manner relative to the primary side n-type MOSFETs; and
a current sharing control section coupled to the gate driver controllers configured to:
  compare a current through each output inductor to an average current through all output inductors;
  as a result of the current through L1 being greater than the average current, decrease the on time of $T1_A$ and $T1_B$ and, as a result of the current through L1 being less than the average current, increase the on time of $T1_A$ and $T1_B$;
  as a result of the current through L3 being greater than the average current, decrease the on time of $T3_A$ and $T3_B$ and, as a result of the current through L3 being less than the average current, increase the on time of $T3_A$ and $T3_B$;
  as a result of the current through L2 being greater than the average current, decrease the on time of $T2_A$ and $T2_B$ and, as a result of the current through L2 being less than the average current, increase the on time of $T2_A$ and $T2_B$; and
  as a result of the current through L4 being greater than the average current, decrease the on time of $T4_A$ and $T4_B$ and, as a result of the current through L4 being less than the average current, increase the on time of $T4_A$ and $T4_B$.

15. The apparatus of claim 14 wherein the control circuit further comprises a voltage balance control section configured to:
  compare a sum of currents through L1 and L3 to a sum of currents through L2 and L4;
  as a result of the sum of currents through L1 and L3 being greater than the sum of currents through L2 and L4, increase the on time of $T1_{A/B}$ and $T3_{A/B}$ and decrease the on time of $T2_{A/B}$ and $T4_{A/B}$; and
  as a result of the sum of currents through L1 and L3 being less than the sum of currents through L2 and L4, decrease the on time of $T1_{A/B}$ and $T3_{A/B}$ and increase the on time of $T2_{A/B}$ and $T4_{A/B}$.

16. The apparatus of claim 14 wherein the control circuit further comprises a voltage balance control section configured to:
  compare a voltage across capacitor C2 to an input voltage divided by 2;
  as a result of the voltage across capacitor C2 being less than the input voltage divided by 2, increase the on time of $T1_{A/B}$ and $T3_{A/B}$ and decrease the on time of $T2_{A/B}$ and $T4_{a/B}$; and
  as a result of the voltage across capacitor C2 being greater than the input voltage divided by 2, decrease the on time of $T1_{A/B}$ and $T3_{A/B}$ and increase the on time of $T2_{A/B}$ and $T4_{A/B}$.

* * * * *